Figure 1:
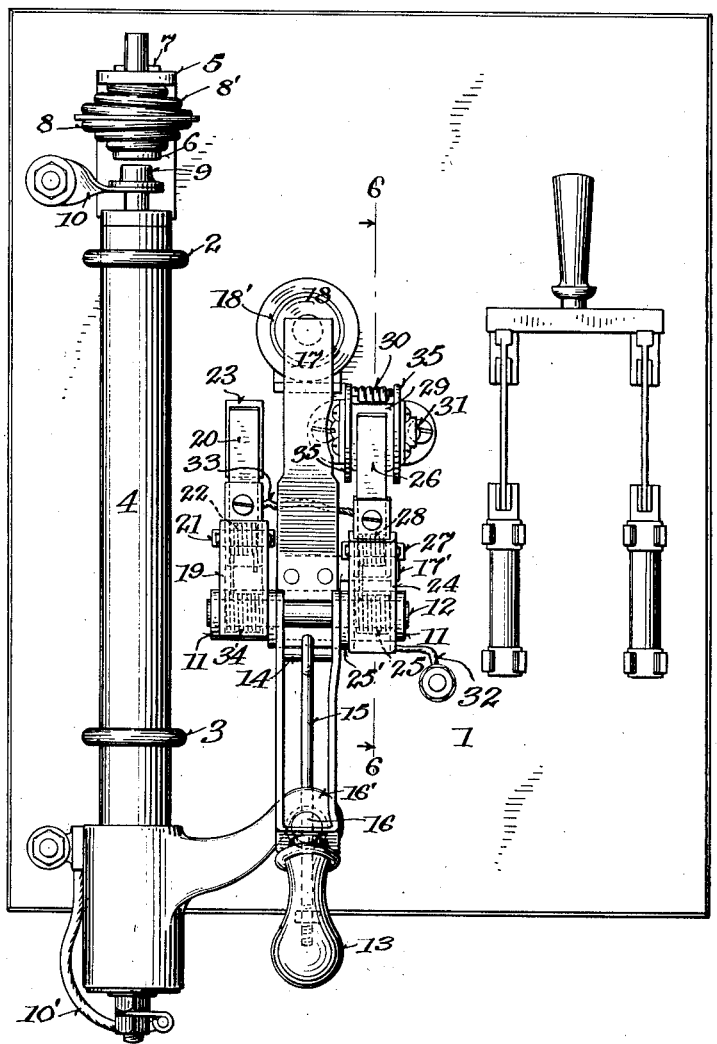

H. L. BRADLEY.
MOTOR STARTER OR ELECTRIC CURRENT CONTROLLER.
APPLICATION FILED JUNE 5, 1916.

1,317,773.

Patented Oct. 7, 1919.
6 SHEETS—SHEET 3.

Witnesses
Fred Palm
G. S. Salentine

Inventor
Harry L. Bradley
By
Louis Quarles
Attorney

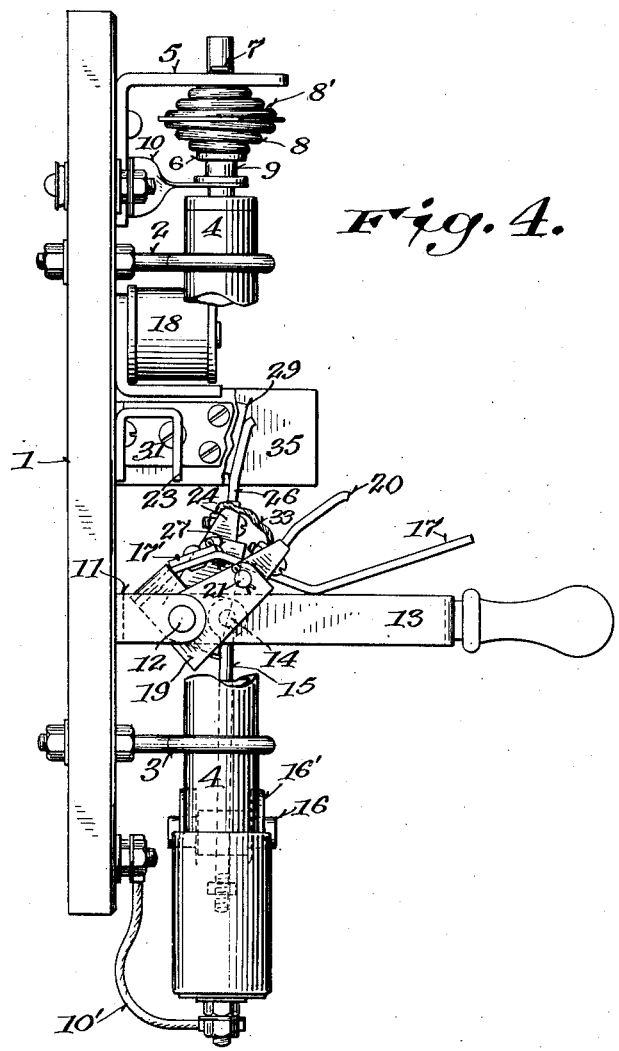

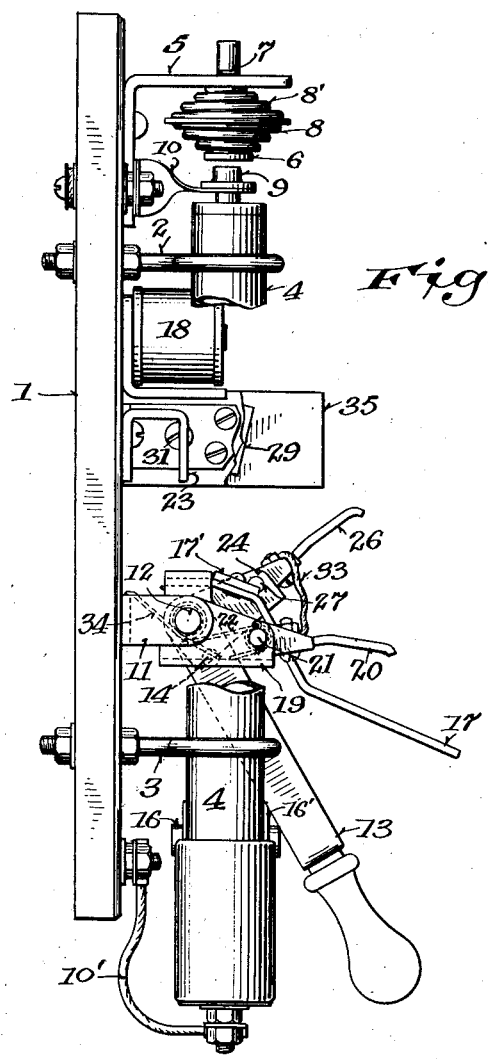

H. L. BRADLEY.
MOTOR STARTER OR ELECTRIC CURRENT CONTROLLER.
APPLICATION FILED JUNE 5, 1916.

1,317,773.

Patented Oct. 7, 1919.
6 SHEETS—SHEET 6.

Witnesses
Fred Palm
G. S. Salentine.

Inventor
Harry L. Bradley
By
Louis Quare
Attorney

UNITED STATES PATENT OFFICE.

HARRY L. BRADLEY, OF MILWAUKEE, WISCONSIN.

MOTOR-STARTER OR ELECTRIC-CURRENT CONTROLLER.

1,317,773.　　　　　Specification of Letters Patent.　　Patented Oct. 7, 1919.

Application filed June 5, 1916. Serial No. 101,712.

*To all whom it may concern:*

Be it known that I, HARRY L. BRADLEY, a citizen of the United States, residing at Milwaukee, Wisconsin, have invented certain new and useful Improvements in Motor-Starters or Electric-Current Controllers, of which the following is a specification.

My invention pertains to methods for controlling electric currents by improvements in electric current controllers and particularly to those kinds of controllers used for starting electric motors and embodying electric resistors or resistance mediums, whose resistance is subject to change by pressure.
My invention as illustrated relates especially to improvements in the class of controlling devices disclosed in the former patents dated January 28, 1913, No. 1,051,480 and July 8, 1913, No. 1,066,580.
In the construction of electric current controllers and particularly those used in connection with the starting and control of electric motors, it is often necessary that they be so arranged that they will automatically retrieve or disconnect the motor or apparatus controlled from the supply circuit in event of partial or complete failure of the power supply. This retrieving feature in connection with electric control apparatus is commonly termed the "no voltage release feature."

When starters or controllers are operated manually, it is necessary that the operating levers be so arranged that they will cause the necessary circuit changes to be made while being moved through the various positions, and upon accidental or intentional shutting off of the current from the motor the lever will automatically return to the off or normal position, or that some means be provided so that the motor will be disconnected from the power circuit and the insertion of the protecting resistance in the motor circuit be insured before an effort is made to again start the motor.

Electric motor controllers that have incorporated in their construction a resistance medium of the carbon pile form, or some form of resistance element whose conductivity is varied by pressure, have not only the circuit changes to be made by the operating lever, but also in addition the compression changes on the resistance mediums and as a result more effort must generally be exerted through the operating lever in rheostatic control apparatus incorporating a compressible resistance, than in connection with the so-called "fixed step" type of rheostat. The reaction of the compressive effort exerted upon the resistance elements acts in a direction tending to cause the compression and switching mechanism to return to the off or normal position with a force correspondingly great.

It is general practice to employ some form of electro-magnetic device, as a retaining means to hold the operating lever and switching mechanism in the position desired. This retaining means is made strong enough to hold the lever against the retrieving force and at times this retrieving power is great enough to require large and expensive electro-magnets, or as an alternative some form of mechanism must be arranged to work in connection with smaller coils so as to give them a mechanical advantage over the retrieving force.

Electric control apparatus of the form embodying a compressible resistance must necessarily have some of its members of considerable strength and weight in comparison to the construction used in connection with control apparatus of the "step by step" form. Some of these members will be under comparatively great stress when the pressure on the resistance medium is greatest, as the pressure required to reduce the resistance to minimum is sometimes more than 200 pounds per resistance unit and the apparatus is built in various forms, some requiring a dozen units. In order to give these members the strength and stiffness required, they must have considerable mass and in consequence a corresponding amount of momentum and kinetic energy.

When the controller or starter performs its protective function by retrieving or releasing, upon the failure of the current supply, some of the members of the mechanism, when suddenly released from stress, are thrown into rapid motion and due to the momentum they possess make it necessary to provide some strong but resilient bumper to bring the mechanism to rest when the retrieving action is completed. It is desirable, however, that the motion be arrested as abruptly as possible without damage, so the apparatus is almost invariably subjected to more jarring and mechanical stress due to the automatic retrieving action than to the operation of starting the motor, which must necessarily be done manually and with comparative slowness.

The objects of my invention are to provide a form of construction that demands less weight of material than has previously been necessary in the building of controllers of this class, and particularly less weight in the parts that are set in motion by the no voltage release.

It is a further object of my invention to provide a controller requiring less space for installing than has heretofore been necessary.

It is a still further object of my invention to provide a method of construction requiring a less complicated and costly tripping means for restoring the controller to the off or starting position upon the failure of the electric power supply, than it was necessary to provide when the older forms of construction were used.

In my improved controller the arrangement of the mechanism is such that when the operation of starting the motor is completed, only the switch gear, whose function is to bring the motor into and out of the circuit and to shunt or short circuit the resistance members from the circuit when the starting operation is completed, is held in the running position, or away from the normal or off position by the release magnet. When the starting operation is completed, the operating lever is allowed to return to the off or normal position, as is also the resistance compressing members of the mechanism, for when the operating lever is at normal the pressure on the resistance elements is relieved. Therefore the release mechanism is not called upon to maintain the resistance compressing members under stress or the operating lever away from normal while the motor is running, which allows a magnetic releasing device of comparatively slight holding power to be used.

The operating lever and compressing members will be caused to retrieve by the action of gravity and the reaction of the compression members against the resistance elements, if released manually from any point. But it is not often that the lever is released from the extreme position as the natural tendency of the operator will be to allow it to return part way toward normal before letting go, thus reducing the power of the blow against bumpers and the fact that the coincidence of the switch members retrieving at the same time as the operating lever and compression mechanism is extremely seldom; which therefore makes it unnecessary to construct the starter or controller as massively, to withstand the stress caused by an occasional jar of the retrieving action of all of the members of the device simultaneously, as would be necessary if this simultaneous action were to take place after each motor starting operation. The switch members being comparatively light, the arresting of their motion does not require special consideration.

Figure 2:
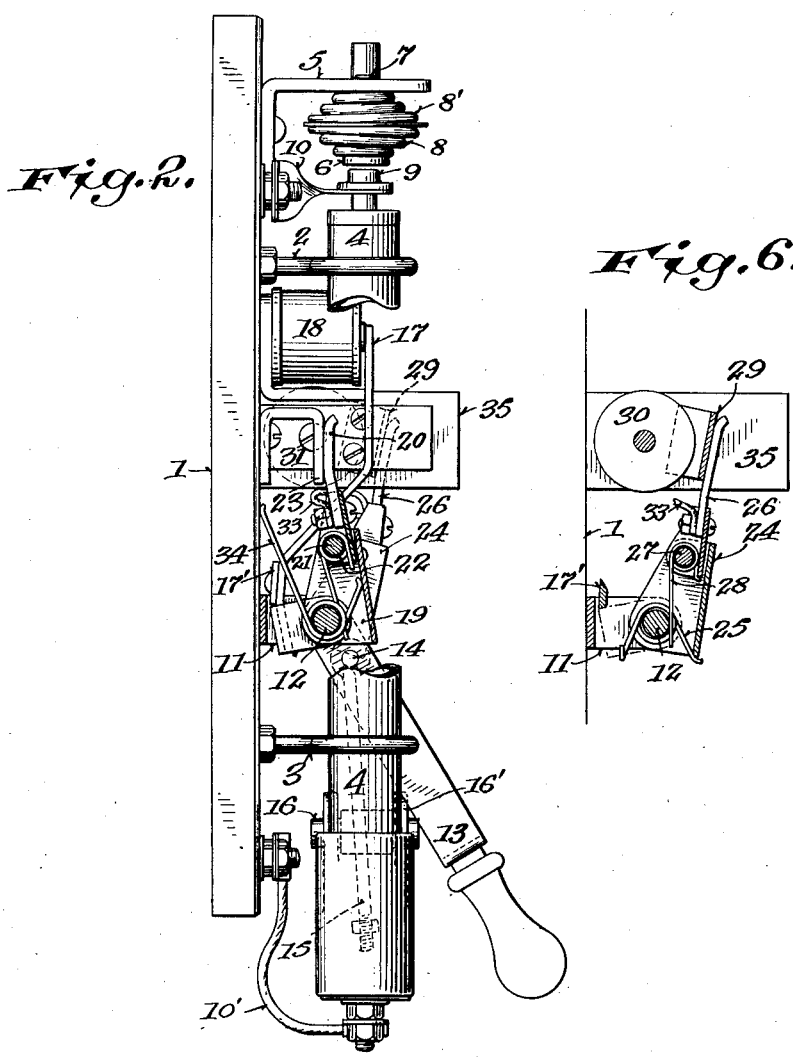
Figure 3:
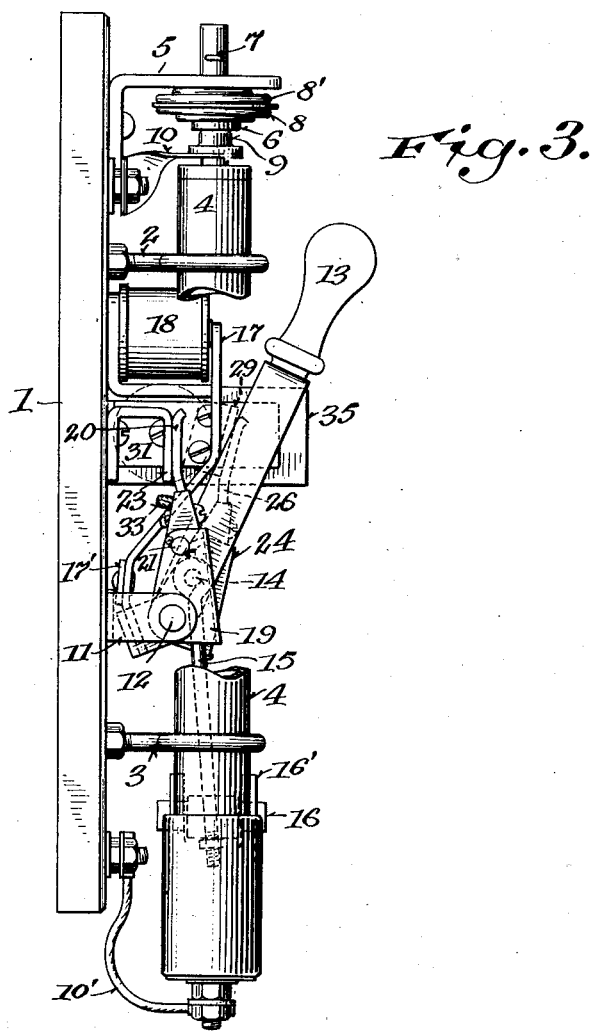
Figure 7:
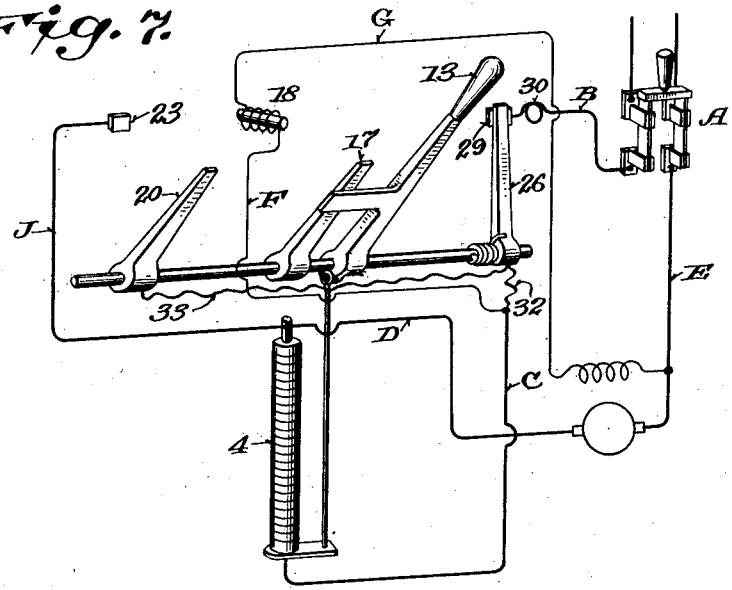
Figure 8:
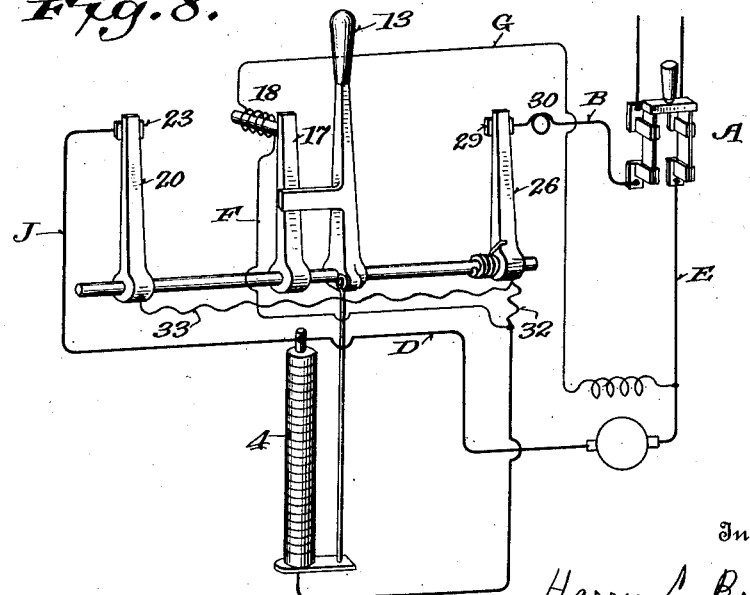

In the drawings:

Figure 1 is a front elevation showing the starter in the "full on" or motor running position, with the operating lever in the downward position or the position of rest. Fig. 2 is a side elevation of the starter in the same position. Fig. 3 is a side elevation of the starter showing the starter in the full on or motor running position with the operating lever in the upward position as it appears before retrieving, just after the motor starting operation is completed. Fig. 4 is a side elevation of the starter as it would appear when making the initial or first contact. Fig. 5 shows the starter at rest or in the off or no current position. Fig. 6 a sectional detail taken along the lines 6—6 on Fig. 1 looking in the direction of the arrows. In all of these excepting Figs. 5 and 6 the tube containing the resistance is shown broken away disclosing the parts behind it. Fig. 7 illustrates the position of the various members of the starter mechanism at the initial or first contact position and shows the commutation of the circuits resulting. Fig. 8 indicates the position of the members at the "full" speed or the position for the normal running of the motor and is for the purpose of illustrating the path of the current at this stage of the starter operation.

Like parts are identified by the same reference numerals throughout all of the views.

An insulating base or panel is indicated by 1, upon which are mounted the brackets 2 and 3, that slidably support the resistance unit 4, shown partly broken away. The resistance unit 4 forms no part of this invention and any type of compressible resistance medium may be made applicable, but the type disclosed is of the form described in the Patent No. 1,054,902, dated March 4, 1913. The bracket 5 is also attached to the panel 1 and slidably supports the yielding abutment 6. The abutment 6 is rigidly maintained against movement in one direction from its relative location by the cotter pin 7 and yieldingly braced against motion in the opposite direction by the springs 8 and 8'. The floating terminal 9 of the resistance unit 4 is arranged to bear against the abutment 6 during the motor starting operation, at which time the resistance medium is compressed. The flexible conductors 10 and 10' transmit the current from the conductors on the panel 1 to the resistance unit 4. The bearing bracket 11 is attached to the panel 1 and carries the shaft 12. Upon the shaft 12 is pivotally mounted the operating lever 13. The lever 13 carries the eccentric pin 14, which in turn acts as a pivotal support for the link 15. The link is attached at its lower end to the insulating shaft 16 upon which the hook 16' rests and which in turn carries the resistance unit 4. The release coil armature 17 is mounted upon the shaft 12 and is rigidly attached to the contact carrying member 19, also mounted upon the shaft 12. The yielding contact or switch member 20 is maintained in its position by means of the pin 21 and is resiliently braced by the spring 22. The contact or switch member 20 is arranged to bear against the fixed contact 23, attached to the panel 1, when the starter is in the full on or motor running position. The no voltage release coil or tripping magnet 18 is also attached to the panel 1 and is so located as to engage the armature 17 when the starter mechanism is in the "full on" or normal motor running position. Another contact carrying member 24 is pivotally mounted on the shaft 12 and to this the motion of the shaft 12 is yieldingly transmitted by means of the spring 25. The yielding contact or switch member 26 is mounted on the contact carrying member 24 by means of the pivot 27, and is held in its relative position by means of the spring 28 and is so arranged as to afford a rolling motion to contact 26 when it engages the stationary contact 29 at the time the operating lever 13 is moved to the initial or first contact position and is maintained by means of spring 28 against this contact 29 throughout the entire motor running period. One end of the spring 25 bears against the U shaped piece 25' of the release coil armature 17 and is so arranged as to cause the contact carrying member 24 to bear against the projection 17', that is a part of the release coil armature 17, when the switch member 26 is not in engagement with the fixed contact 29 or when the starter mechanism is in the "off" or no current position. The stationary contact 29 is provided with a magnetic arc extinguishing member, comprising an electro-magnet 30, from which project the pole pieces 31 and the insulating arc deflecting plates 35. The flexible conductors 32 and 33 lead the current from the conductors on the panel 1 to the contact members 26 and 20. About the shaft 12 is wrapped the spring 34, so arranged in connection with the panel 1 as to tend to hold the mechanism of the starter in and return it to the "off" or no current position. When the device is to be used for alternating current, I employ a shading coil 18' so as to give a continuous magnetic pull thus preventing chattering.

The operation of the device can be understood by further reference to the drawings. Fig. 5 is a side view of the starter with the mechanism in the off or no current position. Fig. 4 is a side view of the starter in the initial or first contact position. It will be observed that the operating lever 13 has been moved so as to bring the yielding mounted contact 26 in engagement with the fixed contact 29. The path of the current is then as shown diagrammatically in Fig. 7 and can be traced by starting at the line switch A; thence through the conductor B and blowout magnet 30 to the fixed contact 29, then through the switch member 26 to the flexible conductor 32; from there through conductor C to the resistance member 4; through the conductor D to the motor armature and from there through conductor E to the switch A. The field will be energized by current passing from the flexible conductor 32 through wire F; through release coil 18; thence through the conductor G, to motor field and from there to the conductor E. It is not necessary that the resistance member be under compression at this stage of the operation of the starter as it is assumed that the resistance is so proportioned that the current flow is sufficient to start the operation of the motor. As the acceleration of the motor proceeds, the operating lever 13 of the starter is steadily moved upward or toward the "full speed" position which results in the bringing of a steadily increasing pressure on the resistance member 4 and a consequent steady reduction of its resistance and a further increase of potential across the motor armature. The rapidity with which the starting lever may be moved toward the full speed position is dependent on the manner in which the motor responds to the increase of power. If the motor is lightly loaded, the starting lever may be moved rapidly to the full speed position. If on the contrary the motor is driving a load approximating its maximum capacity, more time must be consumed in its acceleration and therefore the starting lever must be moved less rapidly.

When the starting lever 13 is finally moved to the limit of its travel toward the "full speed" position, as shown in Fig. 3, it will be noted that the yielding contact or switch member 20 has now engaged the fixed contact 23 on the panel, and it will be further noted that the release coil armature 17 is in engagement with the pole pieces of the magnet 18. The path of the current through the armature will then be as shown in Fig. 8 and can be traced by starting at the switch A; then to the conductor B and blowout coil 30; from there to the contact 29; through the switch member 26 and flexible conductor 33 to the switch member 20; thence through the conductor J to the motor armature; then through the conductor E to the line switch A. It will be observed that in this position of the starter mechanism, the resistance member is shunted from the armature circuit. The field circuit remains the same as described in Fig. 7.

After the described stages of operation of the starter have been completed, the operating lever 13 is allowed to retrieve or return to the off or downward position. This also relieves the resistance member 4 of pressure and allows it also to return to the off or position of rest as shown in Figs. 1 and 2. The switch members are retained in the "full on" position by the action of the release coil armature 17, which is held in the "full on" or upward position by means of the release coil 18, which is energized by the current passing through the motor field. As the release coil armature 17 is rigidly attached to contact carrying member 19 and the shaft 12 and also as the position of the switch member 26 is resiliently governed by the shaft 12 by means of the spring 25, these members will be retained in the "full on" or motor running position as long as the release magnet is energized. Should the current supply be shut off due to the opening of the line switch A or from any other cause, the release magnet 18 will let go its hold on the armature 17, which will allow the reaction of the springs 22, 25, 28, and 34 and the force of gravity to restore the switch members 20 and 26 and the release coil armature 17 to the off or no current position, the return of the contact carrying member 24 being further assured by the projection 17' on the release coil armature 17. As the switch members and no voltage release mechanism are relatively light in weight and therefore possess but little energy of motion, no elaborate means is necessary to absorb the jar when their motion is arrested as would be necessary if it were arranged to have the operating lever retrieve and the pressure released from the resistance unit simultaneously with each retrieving of the switch members.

I claim:

1. The combination with a main electrical circuit of a compressible resistance medium, means for manually compressing said medium, and means for short circuiting or removing said resistance medium from the main circuit while said resistance medium is compressed, said manual compression means being so arranged as to release the pressure on said resistance medium after said resistance medium is removed from the main circuit.

2. The combination with a main electrical circuit of a compressible resistance medium, means for manually compressing said medium, means for short circuiting or removing said resistance medium from the main circuit while said resistance medium is compressed, said manual compression means being so arranged as to release the pressure on said resistance medium after said resistance medium is removed from the main circuit, and means for automatically opening said main circuit when the voltage falls below a predetermined point.

3. The combination with a main electrical circuit of a compressible resistance medium, means for manually compressing said medium, means for short circuiting or removing said resistance medium from the main circuit after said resistance medium has been compressed, said manual compression means being so arranged as to release the pressure on said resistance medium after said resistance medium is removed from the main circuit, and means for automatically opening said main circuit when the voltage falls below a predetermined point, without affecting the compressible resistance medium or the means for its manual compression.

4. In an electric current controller the combination of a compressible resistance medium, means for manually compressing said medium, means for short circuiting or removing said resistance medium from the main circuit after said resistance medium has been compressed, said manual compression means being so arranged as to release the pressure on said resistance medium after said resistance medium is removed from the main circuit, and means for continuing the main circuit after the compressible resistance medium is removed therefrom.

5. In an electric current controller the combination of a compressible resistance medium, means for manually compressing said medium, the said means when at normal position not exerting pressure, means for short circuiting or removing said resistance medium from the main circuit after said resistance medium has been compressed, means for continuing the main circuit after the compressible resistance medium is removed therefrom, said manual compression means being so arranged as to resume its normal position after said resistance medium has been removed from the main circuit.

6. In an electric current controller the combination of a compressible resistance medium, means for manually compressing said medium, the said means when at normal position not exerting pressure, means for short circuiting or removing said resistance medium from the main circuit after said resistance medium has been compressed, means for continuing the main circuit after the compressible resistance medium is removed therefrom, means for automatically opening said main circuit when the voltage falls below a predetermined point, said manual compression means being so arranged as to resume its normal position after said resistance medium has been removed from the main circuit.

7. In an electric current controller the combination of a compressible resistance medium, means for manually compressing said medium, the said means when at normal position not exerting pressure, means for short circuiting or removing said resistance medium from the main circuit after said resistance medium has been compressed, means for continuing the main circuit after the compressible resistance medium is removed therefrom, means for automatically opening said main circuit when the voltage falls below a predetermined point, said manual compression means being so arranged as to resume its normal position after said resistance medium has been removed from the main circuit, without affecting the compressible resistance medium or the means for its manual compression.

8. In combination with an electric motor, a motor starter comprising a compressible resistor for varying the current through said motor, a lever pivoted to vary the pressure on said resistor, a switch mechanism operated by said lever for commutating the circuits of said motor, a release magnet adapted to hold said switch in the position for the normal operation of said motor independent of said lever, said lever being so arranged as to release the pressure on said resistor after the commutation of the motor circuits, and means for moving said switch away from said position of normal motor operation when released by said magnet.

9. In combination with an electric motor, a motor starter comprising a compressible resistor for varying the current through said motor, a lever pivoted to vary the pressure on said resistor, a plurality of switches operated by said lever for commutating the circuits of said motor, a release magnet adapted to hold said switches in the position for the normal operation of said motor independent of said lever, said lever being so arranged as to release the pressure on said resistor after the commutation of the motor circuits, and means for moving said switches away from said position of normal motor operation when released by said magnet.

10. In combination with an electric motor, a motor starter comprising a compressible resistor for varying the current through said motor, a lever pivoted to vary the pressure on said resistor, a plurality of rolling contact switches operated by said lever for commutating the circuits of said motor, a release magnet adapted to hold said switches in the position for the normal operation of said motor independent of said lever, said lever being so arranged as to release the pressure on said resistor after the commutation of the motor circuits, and means for moving said switches away from said position of normal motor operation when released by said magnet.

11. In the combination with an electric motor, a motor starter comprising a compressible resistor for varying the current through said motor, a lever pivoted to vary the pressure on said resistor, said lever biased in one direction, a switch mechanism operated by said lever for commutating the circuits of said motor, a release magnet adapted to hold said switch mechanism in position for the normal operation of said motor independent of said lever, said lever being so arranged as to release the pressure on said resistor after the commutation of the motor circuits, and means for moving said switches away from said position of normal motor operation when released by said magnet.

HARRY L. BRADLEY.

Witnesses:
CARL CALKINS,
H. D. LINDSAY.